A. LUCAND.
DRIVE FOR MOTOR VEHICLES.
APPLICATION FILED JUNE 25, 1919.
1,330,883.
Patented Feb. 17, 1920.
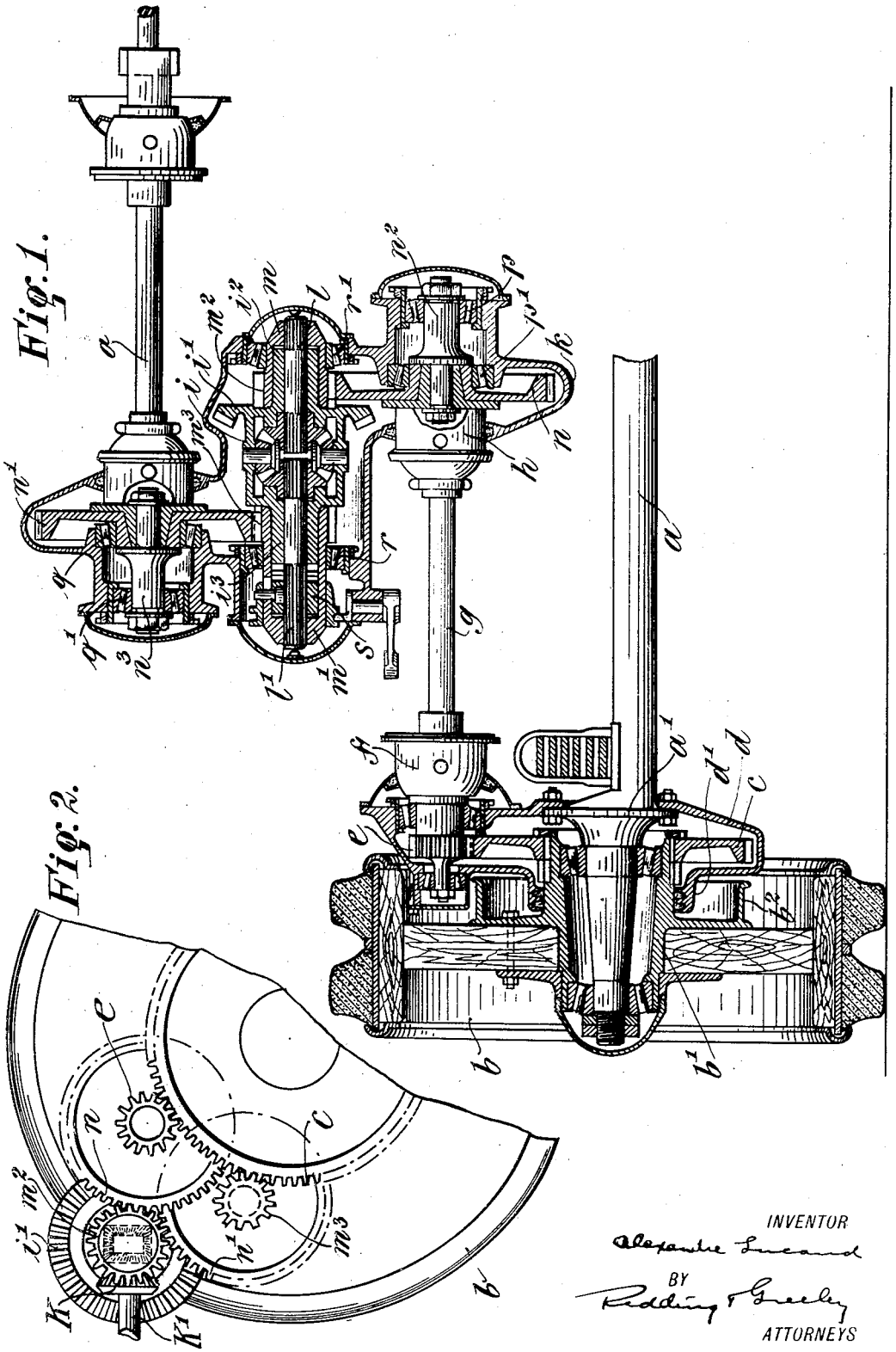
INVENTOR
Alexandre Lucand
BY
Redding & Greeley
ATTORNEYS

UNITED STATES PATENT OFFICE.

ALEXANDER LUCAND, OF NEW YORK, N. Y., ASSIGNOR TO INTERNATIONAL MOTOR COMPANY, OF NEW YORK, N. Y., A CORPORATION OF DELAWARE.

DRIVE FOR MOTOR-VEHICLES.

1,330,883.  Specification of Letters Patent.  Patented Feb. 17, 1920.

Application filed June 25, 1919. Serial No. 306,679.

*To all whom it may concern:*

Be it known that I, ALEXANDER LUCAND, a citizen of the United States, residing in the borough of Manhattan of the city of New York, in the State of New York, have invented certain new and useful Improvements in Drives for Motor-Vehicles, of which the following is a specification, reference being had to the accompanying drawing, forming a part hereof.

This invention has for its object to provide in a drive for motor vehicles live axle sections which are of substantially greater length than has been heretofore possible in known drives. The relatively great angular movement of the live axle sections in a drive has been recognized as objectionable because of the excessive wear and stresses imposed on the universal joints associated with the shafts and the lack of efficiency when the shafts assume an angular position with relation to either the driving or driven units. Any increase in length of the driving axle sections reduces the angular movement thereof for a given relative movement between the wheels and the differential, but in known constructions the length of the shafts has been limited, roughly speaking, to the distance between the wheels and the differential gear. In such known constructions it has been the practice to connect each driven element of the differential gear to the wheel nearest it. In accordance with the present invention each driven element of the differential gear is connected to the wheel most remote from it, so that the interposed driving shaft is of substantially increased length and its angular movement correspondingly decreased. While the invention is in no sense to be limited to the type of drive in which the improvements are incorporated there is illustrated in the accompanying drawing an embodiment in which the differential gear is mounted on the frame of the vehicle and drives the wheels through Cardan shafts connected operatively through spur pinions and spur gears to the wheels. In the drawing—

Figure 1 is a fragmentary view, partly in section and partly in elevation of one wheel of a motor vehicle with which is associated the improved drive, the differential gear and one of the Cardan shafts being swung into the same vertical plane with the other Cardan shaft, in the interest of clearness.

Fig. 2 is a fragmentary view in side elevation and somewhat diagrammatic, showing particularly the relation between the several shafts.

As the description proceeds it will be evident that the improved drive may be applied to steering or non-steering wheels and other types of drives than that illustrated. As shown in the drawing, for the purposes of this specification, the dead axle $a$ has mounted thereon a nonsteering wheel $b$, on the inner hub of which is secured a spur gear $c$ incased by the gear flange $d$ which may be secured to a flange $a'$ formed on the axle $a$ and be bent reversely, as at $d'$, to engage the hub $b'$ of the wheel in such manner as to prevent the entry of foreign substances into the casing thus formed by the gear flange. The brake drum $b^2$ may be formed with or carried on the wheel hub $b'$ exteriorly of the housing formed by the gear flange $d$. Within the gear flange $d$ is journaled a driving pinion $e$ in mesh with the spur gear $c$ this pinion being connected through a universal joint $f$ to a driving Cardan shaft $g$, the other end of which may be connected to a universal joint $h$ for flexible driving engagement with a differential gear, the box of which is indicated at $i$.

The driving devices proper, which are now to be described, may be mounted, in the embodiment illustrated, in a suitable housing $k$ which may be carried on the frame in any convenient manner and in a way which is now common practice and constitutes no part of this invention. The differential box $i$ carries a master bevel gear $i'$ which derives its power from a pinion K carried on a drive shaft $K'$. The differential gear box has formed on its opposite sides sleeves $i^2$, $i^3$ through which extend differential stub shafts $l$, $l'$, these stub shafts being splined to gear hubs $m$, $m'$ on which are formed driving spur gears $m^2$, $m^3$, respectively. Considering the gear box $i$ as being mounted approximately on the center line of the vehicle, that is, about midway between the wheel $b$ and the other wheel (not illustrated) on the end of the axle $a$, it will be apparent that the spur gear $m^2$ to the right of the gear box $i$ is disposed well to the right of this center line while the other spur gear $m^3$ to the left of the gear box $i$ is disposed well to the left of this center line. It is proposed, in accordance with the present invention, to transmit the driving power from the differential gear to the left hand wheel $b$ through operative connections with the differential gear which, generally speaking, are disposed to the right of the gear, while the driving power which is transmitted to the right hand wheel from the differential gear is transmitted through driving connections with the differential disposed generally to the left thereof. In the precise embodiment illustrated the drive power from the differential to the wheel $b$ is transmitted through a driving element, such as the spur gear $m^2$ disposed at the right of the differential and a second spur gear $n$ in mesh therewith through the Cardan shaft $g$ and the associated devices described above. In like manner, the driving power for the right hand wheel (not illustrated) is transmitted from the spur gear $m^3$ to the left of the differential box $i$ through a spur gear $n'$ enmeshed therewith and associated drive elements corresponding exactly to those described in connection with the Cardan shaft $g$ and the wheel $b$. By disposing those transmission elements which are associated directly with the gear box $i$, for the wheel $b$, to the right of the differential box, it will be evident that the Cardan shaft $g$ may be of substantially greater length than has heretofore been possible. Ordinarily the Cardan shaft $g$ would, of course, derive its power from transmission elements associated with the differential gear at the left of the gear box $i$. In the same manner, the other wheel (not illustrated) may be driven from the spur gear $n'$ through a Cardan shaft $o$ which may be of relatively great length. Where the differential box $i$ is disposed midway between the wheels it may be expected that the Cardan shafts $g$ and $o$ are of equal length, but the invention is not limited to those features. By reason of the great length of the driving shafts their angular movement is materially reduced, in fact it has been found possible to reduce this angular movement by fifty per cent. The wear on the differential joints associated with the Cardan shafts is also greatly reduced as will be understood and the driving efficiency due to the reduced angularity is correspondingly increased.

The housing $k$ for the differential gear and the associated driving units may be so formed as to afford ready and accessible supporting surfaces for the bearings $p$, $p'$ for the shaft $n^2$ of the gear $n$ and for the bearings $q$, $q'$ for the shaft $n^3$ of the spur gear $n'$. The housing $k$ also affords support for the bearings $r$, $r'$ for the differential box $i$ and the associated differential stub shafts $l$, $l'$.

There is also incorporated in the driving devices a sliding jaw clutch $s$ by which the box $i$ may be locked to the differential stub shaft $l'$ and differential movement between the two shafts $l$, $l'$ be thereby prevented. This locking device is desirable for insuring the application of equal power to the two wheels.

The elements constituting the novel features of the invention will be recited in the appended claims.

I claim as my invention:

1. In a drive for motor vehicles, in combination with a differential gear, dead axle and the wheels, live axle sections, operative connections between the live axle sections and the wheels, respectively, and operative connections between each live axle section and the differential at the side of the differential remote from the wheel driven by such section.

2. In a drive for motor vehicles, in combination with a differential gear, dead axle and the wheels, live axle sections, operative connections between the live axle sections and the wheels, respectively, stub differential shafts at each side of the differential, and gearing operatively interposed between each stub shaft and the live axle section for the wheel on the side remote from said stub shaft.

3. In a drive for motor vehicles, in combination with a differential gear, dead axle and wheels, Cardan shafts, operative connections between the wheels and the shafts respectively, stub differential shafts at each side of the differential, and gearing operatively interposed between each stub shaft and the Cardan shaft on the side remote from the wheel to be driven.

4. In a drive for motor vehicles, in combination with a differential gear, dead axle and wheels, Cardan shafts, gears on the wheels and the shafts in driving engagement, stub differential shafts at each side of the differential, a gear carried on each stub shaft and a gear on each Cardan shaft in driving engagement with the gear on the stub shaft on the side remote from the wheel to be driven.

5. In a drive for motor vehicles, in combination with a differential gear mounted on the vehicle frame, dead axle and wheels, a gear on each wheel, a driving pinion in mesh therewith, a Cardan shaft connected with each pinion, stub differential shafts at each side of the differential gear, a spur gear on each stub shaft and a spur gear on each Cardan shaft in mesh with the spur gear on the stub shaft on the side remote from the wheel to be driven.

6. In a drive for motor vehicles, in combination with a differential gear mounted on the vehicle frame, dead axle and wheels, a gear on each wheel, a driving pinion in mesh therewith, a Cardan shaft connected with each pinion, stub differential shafts at each side of the differential gear, a spur gear on each stub shaft, a spur gear on each Cardan shaft in mesh with the spur gear on the stub shaft on the side remote from the wheel to be driven, and means to lock the differential stub shafts against differential movement.

7. In a drive for motor vehicles in combination with a differential gear, dead axle and the wheels, live axle sections, operative connections between the live axle sections and the wheels, respectively, operative connections between each live axle section and the differential at the side of the differential remote from the wheel driven by said sections and means to lock the differential against differential movement.

This specification signed this 23d day of June, A. D. 1919.

ALEXANDER LUCAND.